4 3,483,062
Patented Dec. 9, 1969

3,483,062
METHOD OF REDUCING ADHESION
Evelyn W. Madge, Four Oaks, England, assignor to The Dunlop Company Limited, a British company
No Drawing. Filed Dec. 19, 1966, Ser. No. 602,461
Claims priority, application Great Britain, Jan. 1, 1966, 15/66
Int. Cl. B29h 21/04
U.S. Cl. 156—401                 17 Claims This invention relates to a method for reducing adhesion between a layer of an unvulcanized rubber composition and a layer of a vulcanized or unvulcanized rubber composition.

According to the present invention a method for reducing adhesion between the surface of two layers of rubber composition at least one of which layers is a layer of an unvulcanized rubber composition comprises forming a non-tacky film comprising trans-polyisoprene on at least one of the surfaces to be contacted prior to contacting the two layers of rubber composition.

It is necessary in the production of many articles to assemble a layer of an unvulcanizzed rubber composition with a layer of a vulcanized or unvulcanized rubber composition. For example, in the manufacture of mechanical belting or other fabric reinforced rubber articles such as pneumatic tyres and rubber boots it is necessary to assemble layers of rubber-coated fabrics in superposed relationship and to cover the assembled rubber-coated fabrics with layers of a vulcanized or unvulcanized rubber composition. The rubber compositions in the rubber-coated fabric layers and in the cover layers are usually unvulcanized compositions which are vulcanized subsequent to application of the cover layers. It has hitherto been a difficulty in the manufacture of such articles that the layers of unvulcanized rubber composition show a natural tendency to adhere together on contact due to the tack of the unvulcanized rubber composition. A similar effect occurs when a layer of an unvulcanized rubber composition is contacted with a layer of a vulcanized rubber composition. This tendency of the layers to adhere together presents difficulty in handling the layers in that these layers must be positioned accurately prior to contact with one another since separation and realignment of the plies is extremely difficult. The present invention greatly reduces this difficulty since the dried film comprising trans-polyisoprene does not exhibit tack and so shows little tendency to adhere to a vulcanized or unvulcanized rubber composition.

The trans-polyisoprene composition is usually applied to form the film of trans-polyisoprene in the form of a solution in an organic solvent or in the form of an aqueous dispersion e.g. a latex. Any organic solvent for the trans-polyisoprene may be used such as hydrocarbons or chlorinated hydrocarbons, but it is preferred to use a volatile, non-toxic solvent and examples of suitable solvents are mixtures of trichloroethylene and methylene chloride; hexane; toluene and petrol fractions. The film comprising trans-polyisoprene can conveniently be formed by brushing, spraying or dipping, especially when it is applied in the form of a solution. However, if the trans-polyisoprene is not applied in the form of a solution then it can be applied by a spreading technique using a roller or a doctor blade. A film comprising trans-polyisoprene can be formed on either or both of the surfaces to be contacted.

It is preferred to apply the trans-polyisoprene in the form of a solution since in this way a very thin film of the trans-polyisoprene can be produced, e.g. a film of thickness from 2 to 10 thousandths of an inch. The strength of the solution is not critical but solutions of from 5 to 15 percent, and preferably about 8 percent, by weight of trans-polyisoprene based on the volume of the solution will normally be used. The strength of the solution will, of course, depend upon the molecular weight of the trans-polyisoprene and the figures given hereinbefore are merely intended as a guide.

The trans-polyisoprene can be synthetic trans-polyisoprene or natural trans-polyisoprene such as gutta-percha or balata. The molecular weight of the trans-polyisoprene is not critical, but in the case of synthetic trans-polyisoprene, those polymers having an intrinsic viscosity in benzene at 28° C. of from 1.5 to 2.0 decilitres/g. are preferred. The synthetic polyisoprene should be predominantly trans-polyisoprene and suitable polymers are those which contain at least 80 percent by weight of the transpolymer and which have a melting point of at least 40° C. Mixtures or blends of trans-polyisoprene with another rubber, e.g. natural rubber, may also be used provided they result in a non-tacky film, e.g. a mixture of 20:80 by weight of natural rubber: transpolyisoprene.

After formation of the film of trans-polyisoprene on at least one of the surfaces to be contacted, the film is dried and this drying can be effected by heating the trans-polyisoprene at an elevated temperature. However, the trans-polyisoprene melts at a temperature of about 60° C., and so temperatures of less than 50° C. are usually employed. Alternatively, the film comprising trans-polyisoprene can be allowed to dry at room temperature.

As hereinbefore stated the method of the present invention can be used in the manufacture of mechanical belting, e.g. transmission or conveyor belting. Such belting usually consists of a textile fabric reinforcement embedded in a vulcanized rubber composition, and is produced by assembling two or more layers of rubber-coated textile fabrics in superposed relationship, covering the assembled rubber-coated plies with layers of a rubber composition, and vulcanizing the resulting assembly. The production of such belting is facilitated by coating the plies with a trans-polyisoprene composition prior to assembly into a belt reinforcement so that a film of the trans-polyisoprene composition is interposed between contacting surfaces of the plies. Usually, both surfaces of each rubber coated fabric ply will be provided with a film comprising trans-polyisoprene.

The films comprising trans-polyisoprene are dried after application to the rubber-coated fabric plies, and after the trans-polyisoprene films have been dried, the coated textile fabrics are superimposed to form the textile fabric reinforcement of the desired belting, and the assembled fabrics are then covered with a vulcanizable natural or synthetic rubber composition. This rubber composition contains vulcanizing ingredients, usually sulphur and mercaptobenzthiazole, and after the textile fabric reinforcement has been covered with the composition, the assembly is moulded under heat and pressure to effect vulcanization of the rubber composition and to consolidate the assembly. The temperature at which the assembly is heated to vulcanize the rubber composition will usually be from 150° C. to 220° C. preferably from 160° C. to 180° C.

The method of the present invention can also advantageously be used in the manufacture of articles by a method which involves transferring a layer of an unvulcanized rubber composition from the surface of a layer of a vulcanized rubber composition to an article to be coated with said layer. For example, modern tyre-building equipment uses an inflatable rolling bag for automatically applying side walls during assembly of the tyre. The sidewall layer of an unvulcanized rubber composition is applied to the surface of the rolling bag which is then inflated to press the sidewall layer into position on the tyre carcass. The tyre carcass is subsequently removed from the rolling bag and this involves stripping the sidewall layer from the surface of the rolling bag. A difficulty hitherto encountered in this process is that the sidewall layer tends to adhere to the rolling bag and consequently may become damaged, especially in the area of the bead, or the bag itself may also be torn and damaged. However, if the surface of the rolling bag is provided with a coating film comprising trans-polyisoprene according to the method of the present invention, the tendency of the sidewall layer to adhere to the rolling bag is greatly reduced, and consequently the risk of damage to the sidewall layer is reduced.

It has hitherto been the practice to discard a rolling bag after a relatively short period of use due to the tendency of the rolling bag to cause damage to the sidewall layer and to become damaged itself. However, if the rolling bag is provided with a film comprising trans-polyisoprene as hereinbefore described, the period of usefulness of the rolling bag can be increased by up to ten times.

The films comprising trans-polyisoprene formed in the method of the present invention do not usually contain vulcanization ingredients, and the trans-polyisoprene becomes cross-linked, or cured, during moulding of the assembly due to diffusion of curing agents into the trans-polyisoprene from the surrounding layers of rubber compositions. However, if desired, the films comprising trans-polyisoprene may contain curing ingredients such as sulphur and mercaptobenzthiazole and/or reinforcing fillers such as carbon black. In addition to curing ingredients the film comprising trans-polyisoprene may contain up to 1 percent and preferably about 0.5 percent by weight based on the total weight of the film of a stabilizer such as a tertiary butyl phenol.

The rubber compositions which can be treated by the method of the invention can be compositions of natural or any synthetic rubber. Examples of suitable synthetic rubbers which may be used are polybutylene, polybutadiene, copolymers of butadiene with styrene or acrylonitrile, polychloroprene, copolymers of ethylene with propylene with or without a third monomer to confer unsaturation on the copolymer, and the sulphide rubbers. Mixtures or blends of various synthetic rubbers may be used, as may mixtures or blends of natural rubber with one or more synthetic rubbers.

In the case of mechanical belting, the rubber composition used to form the rubber-coated textile fabrics will be usually the same as the rubber composition in which the textile fabric reinforcement is embedded, but, if desired, can be a different composition. For example, the rubber used to coat the textile fabric can be flexible but having a poor resistance to impact damage or cutting whilst the covering composition can be less flexible but having a good resistance to impact damage or cutting. It is to be understood that different rubber compositions can be used in various parts of the belt to meet specific requirements, for example the belting can be surfaced with a composition having a high flame resistance.

It is often necessary in the manufacture of belting to separate the reinforcement plies at the ends of the belting in order to insert between them connecting means for connecting the belt end to another belt end. Hitherto this has been a difficult procedure due to the tackiness of the unvulcanized rubber composition used to impregnate the reinforcement plies. The present invention obviates this difficulty in that it provides substantially non-tacky reinforcement plies which can easily be separated prior to vulcanization of the rubber composition. The present invention has the further advantage that the trans-polyisoprene does not affect the properties of the resulting belting.

Having now described my invention, what I claim is:

1. A method for reducing adhesion between the surfaces of two layers of rubber composition at least one of which layers is a layer of an unvulcanized rubber composition which comprises forming a non-tacky film comprising trans-polyisoprene on at least one of the surfaces to be contacted, prior to contacting the surfaces of the two layers of rubber composition.

2. A method according to claim 1 in which the film comprising trans-polyisoprene is formed by applying a solution of trans-polyisoprene in an organic solvent to at least one of the surfaces to be contacted and drying the resulting coating prior to contacting the layers.

3. A method according to claim 1 in which the film comprising trans-polyisoprene is formed by applying an aqueous dispersion of trans-polyisoprene to at least one of the surfaces to be contacted and drying the resulting coating prior to contacting the layers.

4. A method according to claim 2 in which the organic solvent is volatile and non-toxic.

5. A method according to claim 4 in which the solution contains from 5 to 15 percent by weight of trans-polyisoprene based on the total volume of the solution.

6. A method according to claim 1 in which the film comprising trans-polyisoprene has a thickness of between 2 and 10 thousandths of an inch.

7. A method according to claim 1 in which the trans-polyisoprene is gutta-percha.

8. A method according to claim 1 in which the trans-polyisoprene is balata.

9. A method according to claim 1 in which the trans-polyisoprene is synthetic trans-polyisoprene.

10. A method according to claim 9 in which the synthetic trans-polyisoprene contains at least 80 percent by weight of trans-polymer.

11. A method according to claim 9 in which the synthetic trans-polyisoprene has a melting point at least 40° C.

12. A method according to claim 9 in which the trans-polyisoprene has an intrinsic viscosity in benzene at 28° C. of from 1.5 to 2.0 decilitres/g.

13. A method according to claim 1 in which the film comprising trans-polyisoprene also comprises a further rubber.

14. A method according to claim 13 in which the further rubber is natural rubber.

15. A method according to claim 1 in which the film comprising trans-polyisoprene is dried at an elevated temperature not greater than 50° C.

16. A rolling bag suitable for use in the assembly of pneumatic tyres which bag has a film comprising trans-polyisoprene on at least the part of its surface which contacts the sidewall of the tyre.

17. A method for the assembly of a belt which comprises assembling in superposed relationship at least two layers of rubber composition, at least one of which is an unvulcanized rubber composition and at least one of which contains a fabric reinforcement, at least one of said layers having on its surface to be assembled adjacent to another layer surface a non-tacky film comprising trans-polyisoprene.

References Cited

UNITED STATES PATENTS

| | | | |
|---|---|---|---|
| 2,051,849 | 8/1936 | Hanna | 156—289 |
| 2,631,953 | 3/1953 | Hubbard et al. | 161—243 X |
| 2,656,292 | 10/1953 | Hoover | 161—243 X |
| 2,732,882 | 1/1956 | Kuts | 156—289 X |
| 2,739,093 | 3/1956 | Bull | 156—289 X |
| 3,044,533 | 7/1962 | Lowe | 156—401 |

BENJAMIN A. BORCHELT, Primary Examiner

JAMES FOX, Assistant Examiner

U.S. Cl. X.R.

156—110, 137, 289; 161—243